US011302972B2

(12) United States Patent
Chu et al.

(10) Patent No.: US 11,302,972 B2
(45) Date of Patent: Apr. 12, 2022

(54) BATTERY PACK INCLUDING BATTERIES

(71) Applicant: CONTEMPORARY AMPEREX TECHNOLOGY CO., LIMITED, Fujian (CN)

(72) Inventors: Yannan Chu, Fujian (CN); Mu Qian, Fujian (CN); Jinqing Ji, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/358,498

(22) Filed: Jun. 25, 2021

(65) Prior Publication Data
US 2021/0328281 A1 Oct. 21, 2021

Related U.S. Application Data

(63) Continuation of application No. PCT/CN2019/075823, filed on Feb. 22, 2019.

(30) Foreign Application Priority Data

Dec. 29, 2018 (CN) .......................... 201811637281.6

(51) Int. Cl.
*H01M 10/52* (2006.01)
*H01M 50/24* (2021.01)
(Continued)

(52) U.S. Cl.
CPC ........... *H01M 10/52* (2013.01); *H01M 50/24* (2021.01); *H01M 50/3425* (2021.01); *H01M 50/367* (2021.01); *H01M 50/249* (2021.01)

(58) Field of Classification Search
CPC .. H01M 10/52; H01M 50/24; H01M 50/3425; H01M 50/367; H01M 50/249
See application file for complete search history.

(56) References Cited

U.S. PATENT DOCUMENTS

2011/0117401 A1 5/2011 Lee et al.
2013/0130071 A1* 5/2013 Adachi ................. H01M 50/35
429/53
(Continued)

FOREIGN PATENT DOCUMENTS

CN 1141095 A 1/1997
CN 203690383 U 7/2014
(Continued)

OTHER PUBLICATIONS

CN106684287 English Translation May 2017 (Year: 2017).*
(Continued)

*Primary Examiner* — Jimmy Vo
(74) *Attorney, Agent, or Firm* — Scully Scott Murphy & Presser

(57) ABSTRACT

The present application provides a battery pack. The battery pack includes a box, the box being configured as a cavity structure; an exhaust channel arranged at the bottom of the box; and a plurality of battery cells, the plurality of battery cells being stacked and housed in the cavity structure of the box, and the plurality of battery cells being located on an end face of the exhaust channel facing away from the bottom of the box, and an end face of each of the battery cells facing the exhaust channel being provided with an explosion-proof valve, where a structural layer of the exhaust channel facing the explosion-proof valve is provided with a weakened zone, and when thermal runaway occurs in any battery cell, a gas in the battery cell is capable of being collected into the exhaust channel via the weakened zone and discharged.

19 Claims, 2 Drawing Sheets

(51) Int. Cl.
  *H01M 50/342*  (2021.01)
  *H01M 50/367*  (2021.01)
  *H01M 50/249*  (2021.01)

(56) References Cited

U.S. PATENT DOCUMENTS

| | | | |
|---|---|---|---|
| 2016/0099451 A1* | 4/2016 | Murai | H01M 50/20 |
| | | | 429/54 |
| 2018/0212222 A1 | 7/2018 | Barton et al. | |
| 2019/0319249 A1 | 10/2019 | Barton et al. | |
| 2021/0104801 A1 | 4/2021 | Chu et al. | |

FOREIGN PATENT DOCUMENTS

| | | | |
|---|---|---|---|
| CN | 105489812 A | 4/2016 |
| CN | 106532185 A | 3/2017 |
| CN | 106684287 A | 5/2017 |
| CN | 207624783 U | 7/2018 |
| CN | 207967133 U | 10/2018 |
| CN | 207967135 U | 10/2018 |
| EP | 2325922 A1 | 5/2011 |
| EP | 3796412 A1 | 3/2021 |
| GB | 2561212 A | 10/2018 |

OTHER PUBLICATIONS

CN207624783 English Translation Jul. 2018 (Year: 2018).*
International Search Report dated Sep. 23, 2019 issued in PCT/CN2019/075823.

* cited by examiner

BATTERY PACK INCLUDING BATTERIES

This application is a continuation of International Application No. PCT/CN2019/075823, filed on Feb. 22, 2019, which claims priority to Chinese Patent Application No. 201811637281.6, filed to the Chinese Patent Office on Dec. 29, 2018 and entitled "BATTERY PACK", the entire content of which is incorporated in the present application by reference.

TECHNICAL FIELD

The present application relates to the technical field of batteries, and in particular to a battery pack.

BACKGROUND

In recent years, the emergence of new energy vehicles has played a huge role in promoting social development and environmental protection. As a rechargeable battery, a power battery pack is the power source of the new energy vehicles and is widely used in the field of new energy vehicles.

Specifically, the battery pack will have some side reactions in the box of short circuit, overcharge, or the like, and then generate a certain amount of gases at a specific temperature. When the generated gases increase to a certain level, thermal runaway will occur, and then an explosion-proof valve set in the direction of a cabin blasts and ejects a high-pressure and high-temperature gas in the direction of the cabin, which affects the safety in the cabin.

SUMMARY

The object of the present application is to provide a battery pack to alleviate the technical problem of affecting the safety of personnel in a cabin due to ejection of a high-temperature and high-pressure gas in the direction of the cabin when thermal runaway occurs in the battery pack in the prior art.

The present application provides a battery pack, including:

a box, the box being configured as a cavity structure;

an exhaust channel arranged at the bottom of the box; and a plurality of battery cells, the plurality of battery cells being stacked and housed in the cavity structure of the box, and the plurality of battery cells being located on an end face of the exhaust channel facing away from the bottom of the box, and an end face of each of the battery cells facing the exhaust channel being provided with an explosion-proof valve, where a structural layer of the exhaust channel facing the explosion-proof valve is provided with a weakened zone, and when thermal runaway occurs in any battery cell, a gas in the battery cell is configured to be collected into the exhaust channel via the weakened zone and discharged.

Further, the exhaust channel includes:

a plurality of gas channels, at least one end of each of the gas channels being an open end, the open end of each of the gas channels being in communication with the outside of the battery pack, and the explosion-proof valve being located on the end face of the battery cell facing the gas channel, where the weakened zone is located in a structural layer of the gas channel facing the explosion-proof valve, and when thermal runaway occurs in any battery cell, the gas is configured to be collected into the gas channel via the weakened zone and discharged.

Further, the exhaust channel further includes:

a connecting channel provided with a communication port, the communication port being in communication with the outside of the battery pack, where the connecting channel is in communication with the open end of each of the gas channels, and the gas in the gas channel flows from the open end of each of the gas channels to the communication port.

Further, the battery pack further includes:

a first one-way valve, where an air inlet of the first one-way valve is in communication with the gas channels, and the first one-way valve is configured to be opened in response to an increase in pressure in the gas channels.

Further, the battery pack further includes:

a sealing member sealing the communication port, where the sealing member is configured to be opened in response to an increase in pressure in the exhaust channel.

Further, the battery pack further includes:

a second one-way valve arranged on an end face of the connecting channel facing away from the bottom of the box, where an air inlet of the second one-way valve is in communication with the connecting channel, and an opening pressure of the second one-way valve is greater than that of the sealing member.

Further, the box includes:

an upper box provided with a pressure relief valve in communication with the cavity structure; and a lower box sealed with the upper box to form the cavity structure of the box, where a gas flowing out via the second one-way valve is discharged along the pressure relief valve.

Further, a flow guide is arranged between the gas channel and the battery cell, and a flow guide channel is arranged at a position of the flow guide corresponding to the explosion-proof valve.

Further, the battery pack further includes:

a plurality of cushion members arranged between the bottom of the box and the battery cells, where heights of the gas channel and the flow guide are equal to a height of the cushion member.

Further, the battery pack further includes:

a protective plate located in the gas channel and arranged on an end face of the gas channel facing the bottom of the box, where the protective plate is arranged corresponding to the weakened zone.

The beneficial effects of the present application are:

the present application provides a battery pack, which includes a box, a plurality of battery cells stacked in a cavity structure of the box, and an exhaust channel arranged at the bottom of the box, where the plurality of battery cells are located on an end face of the exhaust channel facing away from the bottom of the box, and an end face of each of the battery cells facing the exhaust channel is provided with an explosion-proof valve. Specifically, a structural layer of the exhaust channel facing the explosion-proof valve is provided with a weakened zone, and when thermal runaway occurs in any battery cell, a gas in the battery cell is capable of being collected into the exhaust channel via the weakened zone and discharged. Since the explosion-proof valve is arranged on the end face of each of the battery cells facing the exhaust channel, a high-temperature and high-pressure gas generated by thermal runaway of the battery cell ejects towards the exhaust channel when the thermal runaway occurs in one or more battery cells in the box, which avoids ejection in the direction of a cabin, and ensures the safety of personnel in the cabin. Specifically, the structural layer of the exhaust channel facing the explosion-proof valve is provided with the weakened zone, and the high-temperature gas generated by the thermal runaway of the battery cell is capable of being collected into the exhaust channel via the weakened zone and discharged to the external environment, so that the safety of the battery pack is further improved.

BRIEF DESCRIPTION OF THE DRAWINGS

In order to illustrate the implementation of the present application or the technical solution in the prior art more clearly, brief introduction will be made below to drawings used in the description of the implementation or the prior art, and apparently, the drawings described below are some implementations of the present application, and other drawings can also be obtained based on these drawings by those ordinary skilled in the art without creative efforts.

ICONS

Figure 1:
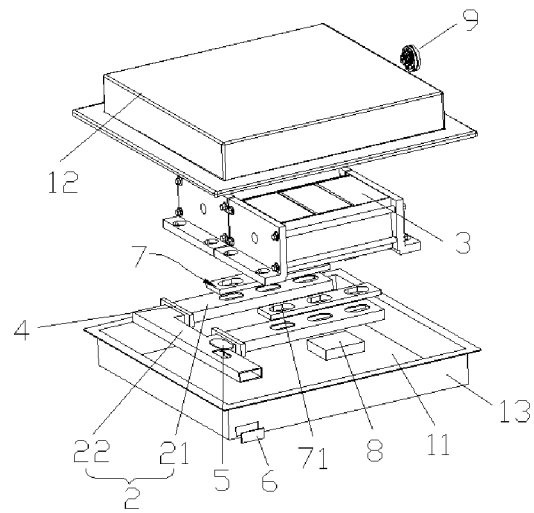
FIG. 1 is an exploded view of a battery pack provided by an embodiment of the present application.
Figure 2:
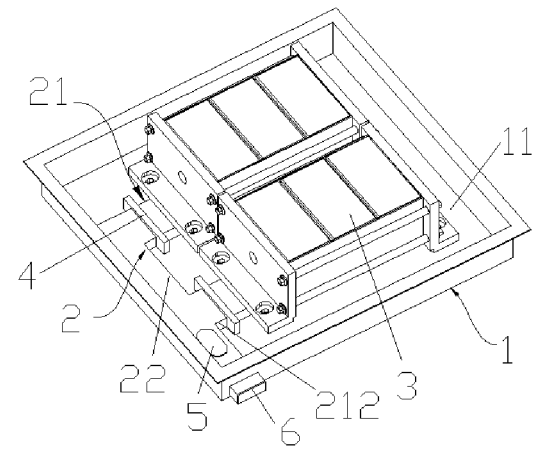
FIG. 2 is a schematic diagram of a structure of the connection between a battery cell and a box provided by an embodiment of the present application.

1—Box;
11—Cavity structure;
12—Upper box;
13—Lower box;
2—Exhaust channel;
21—Gas channel;
  211—Weakened zone;
  212—Open end;
22—Connecting channel;
3—Battery cell;
4—First one-way valve;
5—Second one-way valve;
6—Sealing member;
7—Flow guide;
71—Flow guide channel;
8—Cushion member;
9—Pressure relief valve;
10—Protective plate.

DESCRIPTION OF EMBODIMENTS

Technical solutions of the present application will be clearly and completely described below with reference to the accompanying drawings. Apparently, the described embodiments are some of, rather than all of, the embodiments of the present application. All other embodiments obtained by those of ordinary skill in the art based on the embodiments of the present application without creative efforts shall fall within the protection scope of the present application.

In the description of the present application, it should be noted that orientations or positional relationships indicated by terms such as "inside" and "outside" are orientations or positional relationships shown based on the drawings, and the terms are merely for convenience of describing the present application and for simplifying the description, rather than indicating or implying that an indicated apparatus or element must have a specific orientation, and be constructed and operated in a specific orientation, and therefore cannot be understood as a limitation of the present application.

In the description of the present application, it should be noted that unless otherwise explicitly specified and defined, the terms "mounting", "connecting" and "connection" should be understood in a broad sense, for example, they may be a fixed connection, a detachable connection, or an integrated connection, may be a mechanical connection, or may be an electrical connection, may be a direct connection and may also be an indirect connection via an intermediate medium, or may be communication between the interiors of two elements. Those of ordinary skill in the art can understand specific meanings of the foregoing terms in the present application according to a specific situation.

Specifically, a battery pack includes a box 1 and a plurality of battery cells 3, the box 1 is in a cavity structure 11, and the plurality of battery cells 3 are housed in the cavity structure 11. The box 1 includes an upper box 12 and a lower box 13. The battery cells 3 are placed on the lower box 13, and the upper box 12 and the lower box 13 are connected in a sealing manner to prevent water vapor and the like from entering the box 1 to make an impact on the battery cells 3. Further, when the battery cell 3 is working, a large amount of heat can be generated due to the discharge of positive and negative electrodes of the battery cell 3 and chemical reaction of an electrolyte inside the battery cell 3. When the battery pack is short-circuited, overcharged, or the like, the heat generated by the discharge of the positive and negative electrodes of the battery cell 3 and the chemical reaction of the electrolyte inside the battery cell 3 far exceeds the normal value, so that thermal runaway occurs, and a large amount of high-temperature and high-pressure gases are generated.

As shown in FIG. 1, FIG. 2, FIG. 3 and FIG. 4, in this embodiment, the bottom of the box 1 of the battery pack are provided with an exhaust channel 2, where a plurality of battery cells 3 are located on an end face of the exhaust channel 2 facing away from the bottom of the box 1, and an end face of each of the battery cells 3 facing the exhaust channel 2 is provided with an explosion-proof valve. Specifically, a structural layer of the exhaust channel 2 facing the explosion-proof valve is provided with a weakened zone 211, and when thermal runaway occurs in any battery cell 3, a gas in the battery cell 3 is capable of being collected into the exhaust channel 2 via the weakened zone 211 and discharged. Since the explosion-proof valve is arranged on the end face of each of the battery cells 3 facing the exhaust channel 2, a high-temperature and high-pressure gas generated by thermal runaway of the battery cell 3 ejects towards the exhaust channel 2 when the thermal runaway occurs in one or more battery cells 3 in the box 1, which avoids ejection in the direction of a cabin, and ensures the safety of personnel in the cabin. Specifically, the structural layer of the exhaust channel 2 facing the explosion-proof valve is provided with the weakened zone 211, and the high-temperature gas generated by the thermal runaway of the battery cell 3 is configured to be collected into the exhaust channel 2 via the weakened zone 211 and discharged to the external environment, so that the safety of the battery pack is further improved.

It should be noted here that the weakened zone 211 may be a through hole, a structure with low strength, or a material with a lower melting point, or a structure formed by covering the through hole with a material with a low melting point. Specifically, the configuration of the weakened zone 211 is not specifically limited in this embodiment, as long as the high-temperature and high-pressure gas generated in the battery cell 3 can pass through the weakened zone 211 when thermal runaway occurs.

Further, the exhaust channel 2 includes a plurality of gas channels 21, an open end 212 of each of the gas channels 21 can be in communication with the outside of the battery pack, and the explosion-proof valve is located on the end face of the battery cell 3 facing the gas channel 21. Specifically, the weakened zone 211 is located in a structural layer of the gas channel 21 facing the explosion-proof valve, and when thermal runaway occurs in any battery cell 3, the gas is configured to be collected into the gas channel 21 via the weakened zone 211 and discharged. The gas channel 21 may be open at one end, or may be open at both ends.

Figure 3:
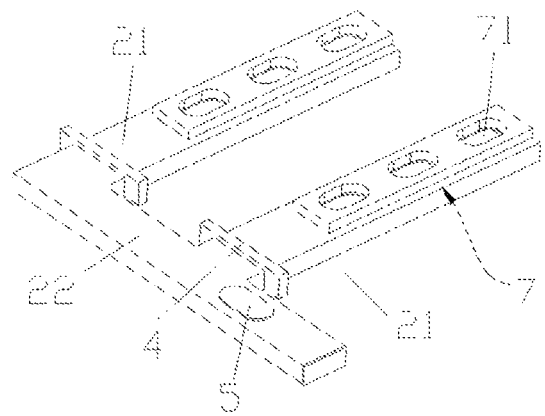
FIG. 3 is a schematic diagram of a structure provided with one connecting channel provided by an embodiment of the present application.
Figure 4:
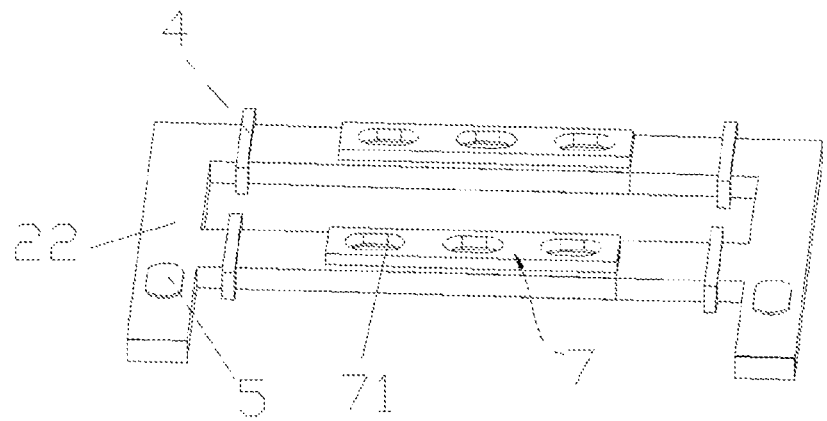
FIG. 4 is a schematic diagram of a structure provided with two connecting channels provided by an embodiment of the present application.
Figure 5:
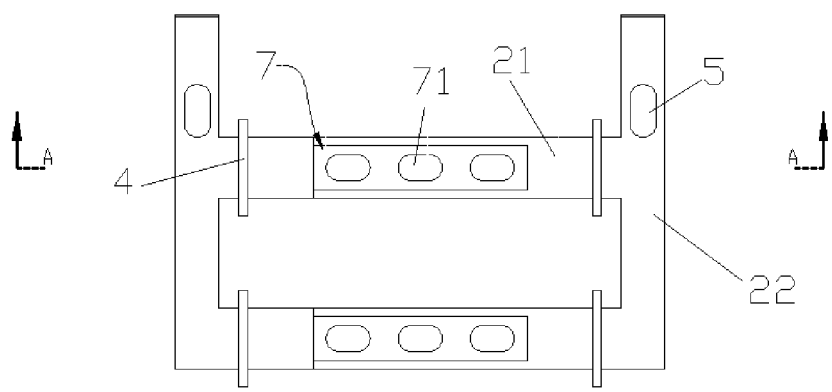
FIG. 5 is a schematic diagram of another view of a structure provided with two connecting channels provided by an embodiment of the present application.
Figure 6:
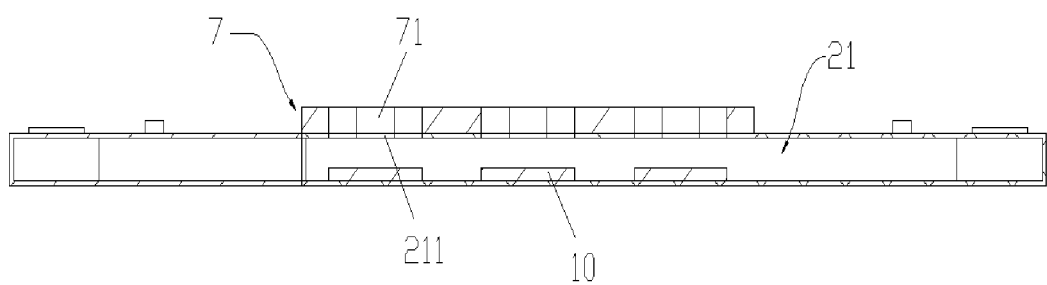
FIG. 6 is a cross-sectional view in the direction of A-A in FIG. 5.

As shown in FIG. 1, FIG. 3 and FIG. 4, each of the battery cells 3 can be directly connected to the gas channel 21 to be able to ensure that the gas generated by the battery cell 3 that has suffered from thermal runaway can flow into the gas channel 21. Specifically, in this embodiment, a flow guide 7 is arranged between the gas channel 21 and the battery cell 3, and a flow guide channel 71 is arranged at a position of the flow guide 7 corresponding to the explosion-proof valve. The gas ejected at the explosion-proof valve can all flow into the corresponding gas flow channel under the guiding action of the flow guide channel 71 to ensure the safety of the gas discharge process. To ensure safety, the flow guide 7 is made of flame-retardant material.

As shown in FIG. 1, further, in order to be able to better protect the integrity of the gas channel 21, and prevent all the weight of the battery cells 3 from being pressed on the gas channel 21, causing the gas channel 21 to deform and affecting the smoothness of gas discharge, in this embodiment, the battery pack further includes a plurality of cushion members 8, the cushion members 8 are arranged between the bottom of the box 1 and the battery cell 3, and specifically, heights of the gas channel 21 and the flow guide 7 are equal to a height of the cushion member 8.

In this embodiment, in order to prevent the bottom of the gas channel 21 from being damaged when the gas enters the gas channel 21, specifically, the battery pack further includes a protective plate 10 located in the gas channel 21 and arranged on an end face of the gas channel 21 facing the bottom of the box 1, and the protective plate 10 is arranged corresponding to the weakened zone 211. As such, the high-temperature and high-pressure gas generated after the thermal runaway will be directly ejected towards the protective plate 10 after entering the gas channel 21, thereby blocking the impact of the gas on the bottom of the gas channel 21.

As shown in FIG. 1, FIG. 2, FIG. 3 and FIG. 4, the gas generated by the thermal runaway of any battery cell 3 can be discharged through the gas channel 21 corresponding to the battery cell 3. In order to be able to discharge the gas in a specified direction to improve the safety of the battery pack, and reduce the number of exhaust ports of the box 1 at the same time, in this embodiment, the exhaust channel 2 further includes a connecting channel 22. Specifically, the connecting channel 22 is provided with a communication port in communication with the outside of the battery pack, and the connecting channel 22 is in communication with the open end 212 of each of the gas channels 21, and the gas in the gas channel 21 flows from the open end 212 of each of the gas channels 21 to the communication port. When thermal runaway occurs in the battery cell 3, the gas flowing to the gas channel 21 is capable of being completely collected into the connecting channel 22 and discharged via the connecting channel 22 in a set direction, which improves the safety of the battery pack.

Further, the connecting channel 22 may be one or more in number. In this embodiment, there are preferably two connecting channels 22, and the two connecting channels 22 are respectively arranged at two ends of each of the gas channels 21. When the gas in the exhaust channel 2 accumulates to a certain pressure, if it cannot be discharged in time, explosion in the exhaust channel 2 may occur. When the number of connecting channels 22 is set to two, the gas in the exhaust channel 2 can be discharged more quickly, which reduces the risk of explosion. Specifically, the two ends of the connecting channel 22 may be provided with communication ports. In order to be able to realize that the gas in the connecting channel 22 is discharged in the same designated direction to improve safety, each connecting channel 22 is provided with a communication port.

Specifically, in this embodiment, in order to ensure the safety of the battery pack, the gas channel 21, the connecting channel 22, the flow guide 7 and the protective plate 10 are all made of flame-retardant materials.

As shown in FIG. 1, further, the communication port of the connecting channel 22 can be in direct communication with the external environment. In order to prevent external dust, moisture, or the like from entering the battery pack, in this embodiment, the battery pack further includes a sealing member 6. The sealing member 6 seals the communication port, and the sealing member 6 is configured to be opened in response to an increase in pressure in the exhaust channel 2.

Specifically, the sealing member 6 may be a one-way valve, and when the pressure in the exhaust channel 2 is greater than a set value, the one-way valve is opened. The sealing member 6 may be a structure with low strength, and after the pressure in the exhaust channel 2 reaches a certain pressure, the low-strength structure is broken and opened. The sealing member 6 may also be made of plastic or metal, and the sealing member 6 may be arranged on the communication port of the connecting channel 22 by means of bonding, clamping, or the like. In order to ensure that the sealing member 6 can be opened quickly in response to the increase in the pressure in the connecting channel 22, in this embodiment, the sealing member 6 is preferably bonded with the communication port, and when the pressure in the exhaust channel 2 is greater than the bonding force, the sealing member 6 is opened.

As shown in FIG. 1, FIG. 2, FIG. 3 and FIG. 4, the connecting channel 22 may be in direct communication with each of the gas channels 21, and the gas in the gas channel 21 may flow into other gas channels 21 through the connecting channel 22, thereby affecting the use of other battery cells 3. And the gas in the gas channel 21 may also hit an inner wall of the connecting channel 22 or the gas channel 21 itself and flow back, resulting in unsmooth gas discharge. In this embodiment, the battery pack further includes a first one-way valve 4, an air inlet of the first one-way valve 4 is in communication with the gas channel 21, and the first one-way valve 4 is configured to be opened in response to an increase in pressure in the gas channel 21. The first one-way valve 4 can ensure that the gas discharged into the connecting channel 22 cannot flow back into the gas channel 21, which improves safety.

Specifically, in order to ensure that the gas in the gas channel 21 can be smoothly discharged along the first one-way valve 4, an opening value of the first one-way valve 4 is smaller than a pressure value generated in the gas channel 21 when thermal runaway occurs in the battery cell 3. The specific structure of the first one-way valve 4 is not limited here, and the first one-way valve 4 meeting the above-mentioned opening condition can be applied to the battery pack.

Please continue to refer to FIG. 1, FIG. 2, FIG. 3 and FIG. 4, the gas generated by the thermal runaway of the battery cell 3 can all flow into the gas channel 21, and then flow into the external environment via the connecting channel 22. When the thermal runaway of the battery cell 3 is severe and the amount of gas generated exceeds a unit flow rate of the communication port of the connecting channel 22, in order to ensure the safety of the battery pack and a vehicle, in this embodiment, the battery pack further includes a second one-way valve 5, and the second one-way valve 5 is arranged on an end face of the connecting channel 22 facing away from the bottom of the box 1, where an air inlet of the second one-way valve 5 is in communication with the connecting channel 22, and an opening pressure of the second one-way valve 5 is greater than that of the sealing member 6. When the gas in the connecting channel 22 cannot be discharged to the external environment in time, that is, the gas pressure value in the gas channel 21 exceeds the pressure value it can bear, the gas in the exhaust channel 2 can also flow out from the second one-way valve 5 at the same time so as to improve safety.

In this embodiment, in order to ensure that the second one-way valve 5 can be opened only when the gas pressure in the exhaust channel 2 exceeds a preset value, specifically, the set opening pressure of the second one-way valve 5 is not less than the pressure value that the gas channel 21 can bear, where the specific structure of the second one-way valve 5 is not limited here, and the second one-way valve 5 meeting the above-mentioned opening condition can be applied to the battery pack.

As shown in FIG. 1, further, in order to enable the gas discharged into the battery box 1 to flow smoothly into the external environment along the second one-way valve 5, in this embodiment, the box 1 includes an upper box 12 and a lower box 13, where the upper box 12 is provided with a pressure relief valve 9 in communication with the cavity structure 11, and the upper box 12 is sealed with the lower box 13 to form the cavity structure 11 of the box 1. Specifically, the gas flowing out via the second one-way valve 5 is discharged along the pressure relief valve 9.

The material discharged from the explosion-proof valve of the battery cell 3 may still contain a flame. In order to further improve the safety performance of the battery pack, a flame-retardant package is also provided in the exhaust channel 2, and a flame-retardant medium is provided in the flame-retardant package. The flame-retardant package is located in the gas channel 21 and is arranged corresponding to the weakened zone 211. When the flame enters the cavity structure 11 from the weakened zone 211 along with the gas, the flame contacts the flame-retardant medium and will not spread to other places in the cavity structure 11.

Finally, it should be noted that: each of the above embodiments is merely used for illustrating rather than limiting the technical solutions of the present application. Although the present application is illustrated in detail with reference to each of the foregoing embodiments, those of ordinary skill in the art should understand that they can still modify the technical solutions described in the foregoing embodiments, or make equivalent substitutions to some of or all of the technical features therein, but these modifications or substitutions can be made to the respective technical solutions without departing from the scope of the technical solutions of the embodiments of the present application.

What is claimed is:

1. A battery pack, comprising:
    a box, the box being configured as a cavity structure;
    an exhaust channel arranged at the bottom of the box; and
    a plurality of battery cells, the plurality of battery cells being stacked and housed in the cavity structure of the box, and the plurality of battery cells being located on an end face of the exhaust channel facing away from the bottom of the box, and an end face of each of the battery cells facing the exhaust channel being provided with an explosion-proof valve,
    wherein a structural layer of the exhaust channel facing the explosion-proof valve is provided with a weakened zone, and when thermal runaway occurs in any battery cell, a gas in the battery cell is configured to be collected into the exhaust channel via the weakened zone and discharged;
    wherein the exhaust channel comprises:
    a plurality of gas channels, at least one end of each of the gas channels being an open end;
    a connecting channel, the connecting channel being in communication with the open end of each of the gas channels; and
    a first one-way valve, being configured to discharge gas into the connecting channel, wherein an air inlet of the first one-way valve is in communication with the gas channels, and the first one-way valve is configured to be opened in response to an increase in pressure in the gas channels.

2. The battery pack according to claim 1, wherein
    the open end of each of the gas channels being in communication with the outside of the battery pack, and the explosion-proof valve being located on the end face of the battery cell facing the gas channel,
    wherein the weakened zone is located in a structural layer of the gas channel facing the explosion-proof valve, and when thermal runaway occurs in any battery cell, the gas is configured to be collected into the gas channel via the weakened zone and discharged.

3. The battery pack according to claim 2, wherein
    the connecting channel is provided with a communication port, the communication port being configured to be in communication with the outside of the battery pack, and
    the gas in the gas channel flows from the open end of each of the gas channels to the communication port.

4. The battery pack according to claim 3, wherein a quantity of connecting channels is two, and the two connecting channels are respectively arranged at two ends of each of the gas channels.

5. The battery pack according to claim 3, wherein each connecting channel is provided with a communication port.

6. The battery pack according to claim 3, wherein the gas channel and the connecting channel are made of flame-retardant materials.

7. The battery pack according to claim 1, wherein an opening value of the first one-way valve is smaller than a pressure value generated in the gas channel when thermal runaway occurs in the battery cell.

8. The battery pack according to claim 3, further comprising:
    a sealing member sealing the communication port, wherein the sealing member is configured to be opened in response to an increase in pressure in the exhaust channel.

9. The battery pack according to claim 8, further comprising:
a second one-way valve arranged on an end face of the connecting channel facing away from the bottom of the box, wherein an air inlet of the second one-way valve is in communication with the connecting channel, and an opening pressure of the second one-way valve is greater than that of the sealing member.

10. The battery pack according to claim 9, wherein the box comprises:
an upper box provided with a pressure relief valve in communication with the cavity structure; and
a lower box sealed with the upper box to form the cavity structure of the box, wherein a gas flowing out via the second one-way valve is discharged along the pressure relief valve.

11. The battery pack according to claim 9, wherein a set opening pressure of the second one-way valve is not less than a pressure value that the gas channel can bear.

12. The battery pack according to claim 8, wherein the sealing member is bonded with the communication port, and the sealing member is configured to be opened when the pressure in the exhaust channel is greater than a bonding force, the sealing member is opened.

13. The battery pack according to claim 8, wherein the sealing member is configured to be a one-way valve or a structure with low strength; or
the sealing member is configured to be made of plastic or metal.

14. The battery pack according to claim 2, wherein a flow guide is arranged between the gas channel and the battery cell, and a flow guide channel is arranged at a position of the flow guide corresponding to the explosion-proof valve.

15. The battery pack according to claim 14, wherein the battery pack further comprises:
a plurality of cushion members arranged between the bottom of the box and the battery cells, wherein heights of the gas channel and the flow guide are equal to a height of the cushion member, and the cushion member is arranged outside of the gas channels.

16. The battery pack according to claim 14, wherein the flow guide is made of flame-retardant material.

17. The battery pack according to claim 2, wherein the battery pack further comprises:
a protective plate located in the gas channel and arranged on an end face of the gas channel facing the bottom of the box; and the protective plate being arranged corresponding to the weakened zone.

18. The battery pack according to claim 2, wherein a flame-retardant package is provided in the exhaust channel, and a flame-retardant medium is provided in the flame-retardant package;
wherein the flame-retardant package is located in the gas channel and is arranged corresponding to the weakened zone.

19. The battery pack according to claim 1, wherein the weakened zone is configured to be a through hole, or a structure with low strength, or a material with a lower melting point, or a structure formed by covering a through hole with a material with a low melting point.

* * * * *